(12) United States Patent
Demon et al.

(10) Patent No.: US 9,526,213 B2
(45) Date of Patent: Dec. 27, 2016

(54) AGRICULTURAL SQUARE BALER

(75) Inventors: Frederik Demon, Brugge (BE);
Sandor Van Vooren, Sijsele-Damme (BE)

(73) Assignee: CNH Industrial America LLC, New Holland, PA (US)

(*) Notice: Subject to any disclaimer, the term of this patent is extended or adjusted under 35 U.S.C. 154(b) by 338 days.

(21) Appl. No.: 14/113,602

(22) PCT Filed: Apr. 24, 2012

(86) PCT No.: PCT/EP2012/057476
§ 371 (c)(1),
(2), (4) Date: Oct. 24, 2013

(87) PCT Pub. No.: WO2012/146582
PCT Pub. Date: Nov. 1, 2012

(65) Prior Publication Data
US 2014/0041536 A1 Feb. 13, 2014

(30) Foreign Application Priority Data

Apr. 27, 2011 (BE) .................................. 2011/0243

(51) Int. Cl.
*A01F 15/08* (2006.01)

(52) U.S. Cl.
CPC ................................ *A01F 15/0875* (2013.01)

(58) Field of Classification Search
CPC ............................ A01F 15/0875; B30B 9/3014
USPC .. 100/7, 188 R, 218, 250, 251; 56/341, 343, 56/361, 474; 414/111, 497, 511, 512, 517, 414/525.1
See application file for complete search history.

(56) References Cited

U.S. PATENT DOCUMENTS

| | | | |
|---|---|---|---|
| 2,799,129 A * | 7/1957 | Huntley | ............... A01D 85/005 100/188 R |
| 4,955,774 A | 9/1990 | Van Eecke et al. | |
| 6,033,172 A | 3/2000 | Simon | |
| 6,431,062 B1 * | 8/2002 | Hawlas | ............... A01F 15/0875 100/188 R |

FOREIGN PATENT DOCUMENTS

| | | |
|---|---|---|
| DE | 2851117 | 12/1980 |
| EP | 0974259 | 1/2000 |

* cited by examiner

Primary Examiner — Jimmy T Nguyen
(74) Attorney, Agent, or Firm — Patrick M. Sheldrake

(57) ABSTRACT

An agricultural baler comprising a controller, sensor and an actuator connected such that in a first position of a bale chute upon sensing of the movement of a completed bale ready to be lowered by the sensor a signal indicative of said movement is fed to the controller by the sensor upon which the controller controls an actuator such that the bale chute is pivoted to the second position which is sufficiently inclined to the horizontal such that the trailing end is sufficiently lowered to prevent a completed bale from toppling or being damaged, wherein the controller is configured to control the actuator such that the bale chute is pivoted from the first position to the second position after receiving the signal indicative of movement from the sensor.

5 Claims, 4 Drawing Sheets

AGRICULTURAL SQUARE BALER

This application is the US National Stage filing of International Application Serial No. PCT/EP2012/057476 filed on Apr. 24, 2012 which claims priority to Belgian Application BE2011/0243 filed Apr. 27, 2011, each of which is incorporated herein by reference in its entirety.

FIELD OF THE INVENTION

The current invention relates to an agricultural square baler according to the preamble of the first claim.

BACKGROUND OF THE INVENTION

Such agricultural square balers are already known to the person skilled in the art. DE2851117A1 for example describes an agricultural square baler comprising a baling chamber and pick-up means collecting crop material from a field and feeding it rearwardly to conveyor means for receiving the crop material collected by the pick-up means and feeding it into the baling chamber. In the baling chamber baling means compress the crop material to a bale. The bale is received by a bale chute disposed at the outlet of the baling chamber. The bale chute lowers the completed bale onto the field after five bales have been arranged on the bale chute extending along a direction crossing the traveling direction of the baler. Thereto, several sensors are arranged to the bale chute. The sensor thereto comprise several hinging bars: two guiding bars extending along the traveling direction of the baler hinging over an axis of rotation mounted perpendicular to the traveling direction of the baler and a feeling bar extending downwardly and hinging over an axis of rotation mounted perpendicular to the traveling direction of the baler. The bale chute has a leading end connected to the outlet of the baling chamber for pivoting movement about an axis transverse to the direction of travel of the baler between a raised first position in which bales from the baling chamber can be received onto the bale chute and a lower second position which is sufficiently inclined to the horizontal to cause a completed bale to slide under the action of gravity along the bale chute and to fall onto the ground from a trailing end of the bale chute. The bale chute is provided to be pivoted between the first and the second position by an actuator in the form of a hydraulic piston. Upon sensing the presence of five completed bales ready to be lowered by the sensor means in the first position of the bale chute, the actuator pivots the bale chute to the second position and the bales are lowered onto the field.

However, the lowering of the bales onto the field is discontinuous, leading to a decreased capacity.

SUMMARY OF THE INVENTION

It is an object of the current invention to provide an agricultural square baler which allows to increase the capacity of the agricultural square baler.

Thereto, the controller is configured to control the actuator such that the bale chute is pivoted from the first position to the second position after receiving the signal indicative of movement from the sensor means. It has been found that such a controller allows a more continuous lowering of the bales onto the field, leading to an increased capacity. Moreover, the more continuous lowering of the bales onto the field allows to avoid to move the bales along a direction crossing the direction of travel of the baler such that in addition, the components for moving the bales along the direction crossing the direction of travel of the baler and the means for receiving the bales after and during movement of the bales along the direction crossing the direction of travel of the baler can be completely omitted.

According to preferred embodiments of the current invention, the bale chute in the first position slopes with respect to the horizontal such that the leading end is higher than the trailing end. Such a first position allows to reduce the travelling distance between the first and the second position.

According to more preferred embodiments of the current invention, the sloping of the bale chute is such that upon completion of a completed bale, the completed bale glides from the leading end towards the trailing end of the bale chute. In such a configuration, the completed bale after completion is almost immediately transported towards the trailing edge of the bale chute without requiring additional manipulations such that bale can be deposited onto the ground more continuously and more rapidly.

According to preferred embodiments of the current invention, the bale chute comprises at least one roller positioned such that in the first position of the bale chute upon completion of a completed bale, the completed bale when moving on the bale chute rotates the roller and in that said sensor means is provided to sense the rotation of said roller. With such a roller and sensor means, the need for cumbersome large components such as for example hinging bars are moreover avoided.

Sensor means for sensing the rotation of said roller are for example already described in EP 0 974 259. The sensor means in EP 0 974 259 however are provided to detect whether a bale has recently been lowered onto the field by the bale chute by generating a warning signal. The sensor means in EP 0 974 259 are not interconnected to an electric controller or actuator as described above.

According to preferred embodiments of the current invention, said sensor means comprise a proximity sensor directed to a member rotated in unison with said roller, the member comprising at least one protrusion changing the distance between the proximity sensor and the surface of the member during rotation of the member in unison with said roller. Such a proximity sensor and member have been proven to provide relative easy and reliable means for measuring the rotation of the roller and therefore movement of the bale on the bale chute.

According to preferred embodiments of the current invention, the actuator is an hydraulic actuator driven by an hydraulic circuit controlled by the controller. Such hydraulic actuators are relatively simple to operate. Moreover, electrically controlling hydraulic actuators using a controller is also relatively simple.

BRIEF DESCRIPTION OF THE DRAWINGS

The invention will be further elucidated by means of the following description and the appended figures.

DETAILED DESCRIPTION OF PREFERRED EMBODIMENTS

Figure 1:
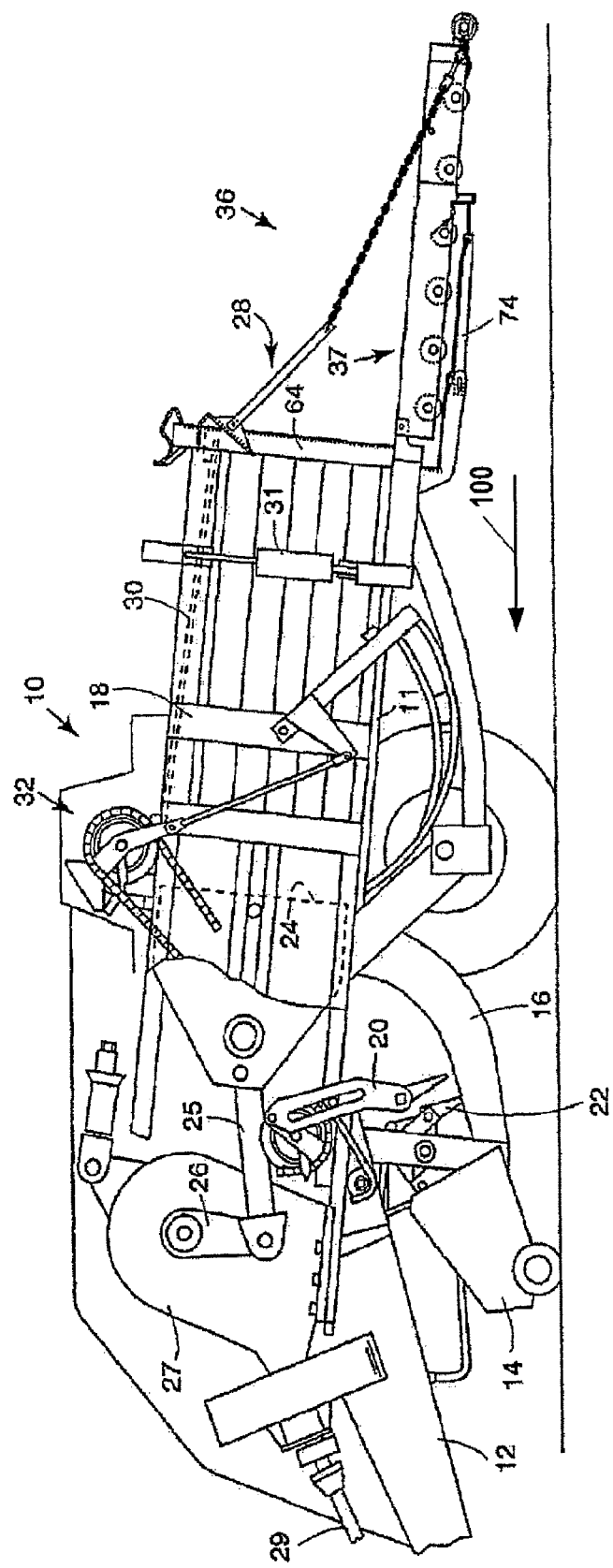
FIG. 1 shows an overview of a preferred embodiment of the agricultural square baler according to the current invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein. Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

The terms "front", "rear", "forward", "rearward", "left" and "right" used throughout this description are determined with respect to the normal direction of travel of the machine in operation. However they are not to be construed as limiting terms.

FIG. 1 shows a preferred embodiment of an agricultural square baler 10 according to the invention comprising a frame 11 which is equipped with a forwardly extending tongue 12 provided with hitch means (not shown) at its front end for coupling the baler 10 to a towing tractor. A conventional pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

The direction of travel 100 is indicated with an arrow pointing along the direction of travel during operation of the agricultural square baler 10.

A plunger 24 reciprocates in a fore-and-aft direction within the baling chamber 18 under action of a pair of pitman rods 25 which are linked to the crank arms 26 of a gearbox 27 rotated by a shaft 29 which is connected to the PTO shaft of the tractor. The reciprocating plunger 24 pushes each new charge introduced into the baling chamber 18 rearwardly and forms the subsequent charges into a bale 34 of crop material, which is pushed by the plunger 24 toward a rearmost discharge aperture 28 of the chamber 18.

The baling chamber 18 comprises at least one movable wall portion 30 of which the position can be adjusted to vary the cross section of the aperture 28. Reduction of this cross section will increase the resistance to rearward movement of the crop bales and hence the density of the crop material contained therein. Similarly an increase in cross section will reduce the resistance and the density of the newly formed bales. The position of the wall portion 30 is controlled by a pair of actuators in the form of hydraulic cylinders 31 (only one shown in FIG. 1) which are installed between the frame 11 and the wall portion 30.

Each bale 34 preferably is securely bound in its final compacted form by a tying mechanism 32 before leaving the confines of the baling chamber 18. The length of each bale produced by the baler 10 can be adjustably predetermined by conventional means not shown. The tying mechanism comprises a series of periodically actuated needles which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
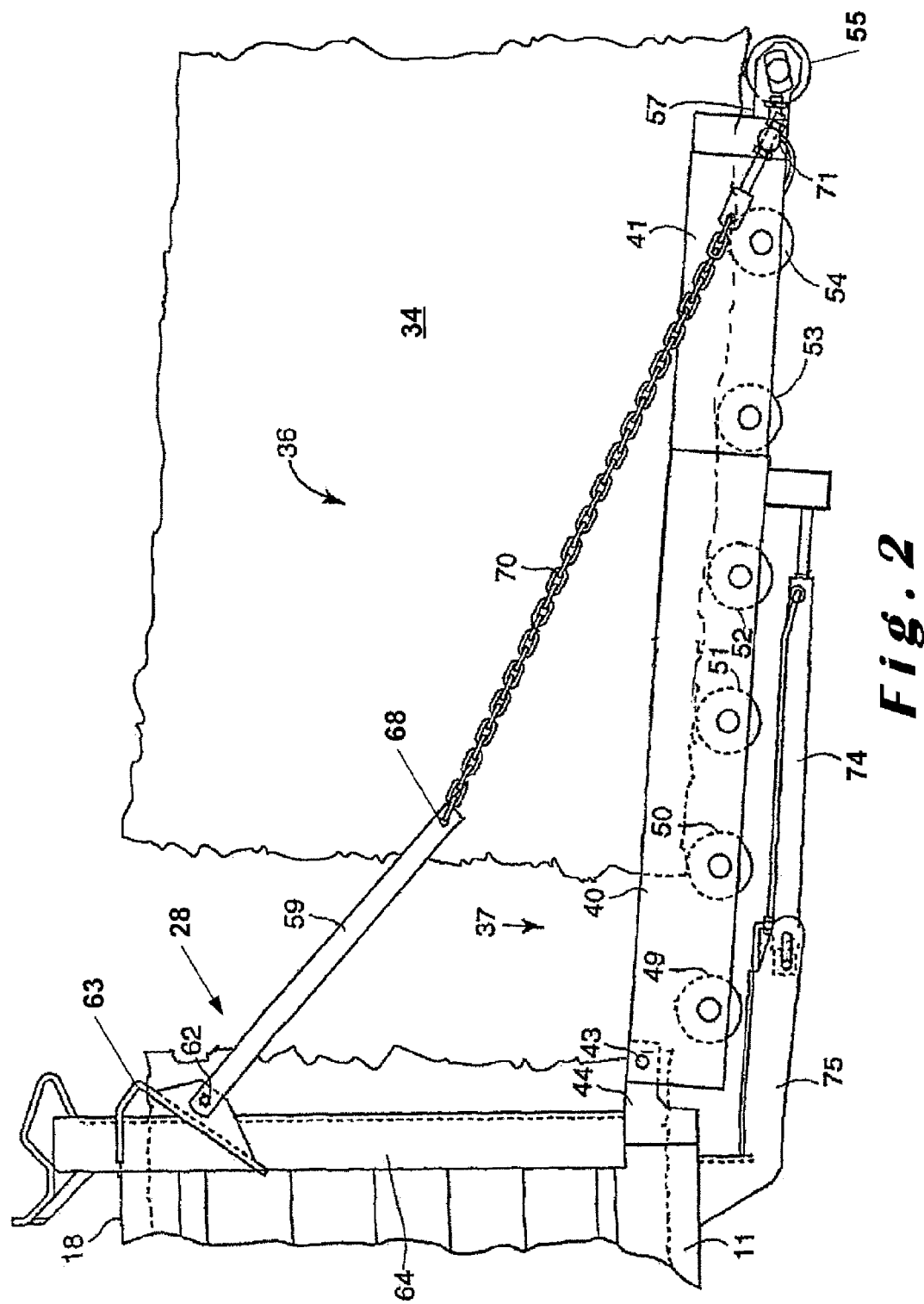
FIG. 2 shows a detail of the bale chute according to FIG. 1 in the second position.

The baler 10 is equipped with bale discharge means 36 in the form of a bale chute, mounted to the rear of the frame 11, adjacent the discharge aperture 28 of the baling chamber 18. The completed bale 34 is received thereon and sustained thereby at least until the rear end of the bale 34 has completely left the confines of the baling chamber 18. FIG. 2 shows the discharge means 36 in further detail. They preferably, but not necessarily, embrace a chute portion 37. The chute portion 37 preferably comprises a rectangular frame 40, which is attached by a pair of pivot pins 43 to lugs 44 welded onto the rear end of the baler frame 11.

The bale chute 36 shown in FIG. 1 in the first position slopes with respect to the horizontal such that the leading end is higher than the trailing end. Moreover, the sloping of the bale chute 36 is such that upon completion of a completed bale, the completed bale glides from the leading end towards the trailing end of the bale chute. In this case the completed bale would glide, more specifically roll, over rollers 49-54. Such a configuration is however not critical for the invention and the bale chute 36 can also be, for example, substantially horizontal.

The chute portion 37 preferably contains a set of six transversely arranged rollers 49-54 which are journaled in the side members of the frame 40 and one additional roller 55, journaled between two rear extensions 57 of the frame 40. The latter roller 55 preferably constitutes the most rearward part of the baler 10 during baling operations.

When the bale discharge means 36 are in their first operating position, i.e. when bales are being compressed in the baling chamber 18, the rear end of the bale chute 36, preferably the chute portion 37, is sustained by a linkage means on each side of the chute frame 40. Each linkage means preferably comprises a pull bar 59 and a chain 70, although other means are also possible. The pull bar 59 has an upper end which is pivotally connected by a bolt assembly 62 to a support 63 on the side of the baling chamber 18. The supports 63 are welded to upright beams 64 which encompass the discharge aperture 28. The chains extend between pins 71 on the sides of the frame 40 and the pull bar connection point 68.

Preferably, the bale chute 36 can be moved into a transport position in which the bale chute 36 is pivoted upwards such that the length of the baler is significantly reduced during transport of the baler, for example when driving the agricultural square baler 10 from one field to another.

The bale chute 36 can be moved from the first operating position to the second lower operating position by means of an actuator, preferably in the form of an hydraulic cylinder 74, which is preferably mounted below the bale chute 36, preferably the chute portion 37, between a support 75 welded to the rear end of the baler frame 11, and the bale chute 36, preferably through a lever arrangement (not shown in the figures). Such an arrangement is however not critical for the invention as the actuator can also be provided above the bale chute 36, for example similar to the actuator shown in DE2851117A1. The cylinder preferably is linked via an appropriate valve (not shown) on the left hand side of the baler frame 11 to the hydraulic circuitry of the baler, e.g. to the portion thereof which controls the hydraulic cylinder 31 of the baling chamber 18 or to circuitry for the control of a hydraulic ram for ejection of a finished bale from the baling chamber 18.

Figure 4:
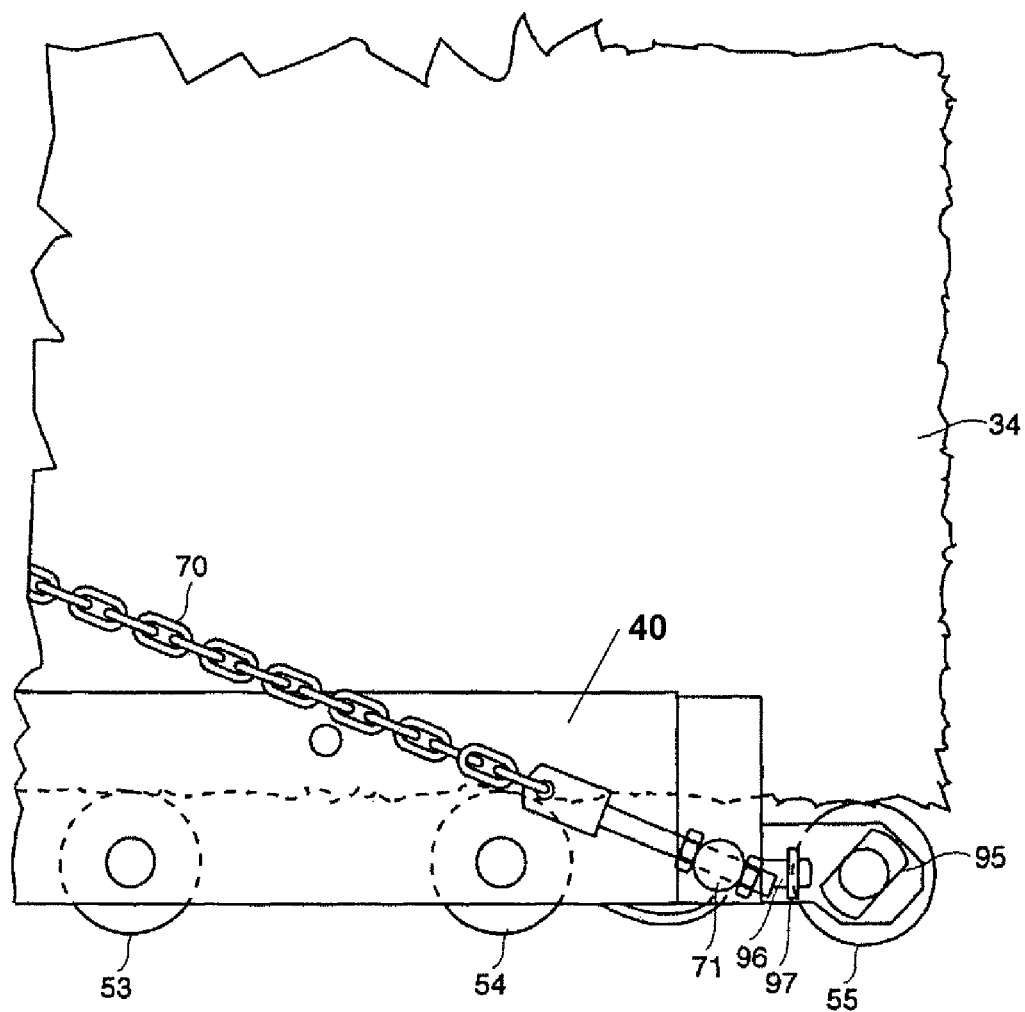
FIG. 4 is a side view of the rear end of said rear portion, showing means for sensing the presence on the bale chute of a completed bale ready to be lowered onto the field and generating an electric signal indicative of said presence.

As shown in FIG. 4, the rear roller 55 has at the outer end of its left journal a member, preferably a sensor plate 95, which is rotated in unison with the roller 55. The member, preferably the sensor plate 95 as shown in FIG. 4, comprises at least one protrusion changing the distance between the proximity sensor and the surface of the member during rotation of the member in unison with said roller. A proximity sensor 96, mounted in a support 97, is directed to the edges of the sensor plate 95 and generates a signal which is indicative of the movement of the roller 55, and hence of the movement of the bale resting on said roller.

Figure 3:
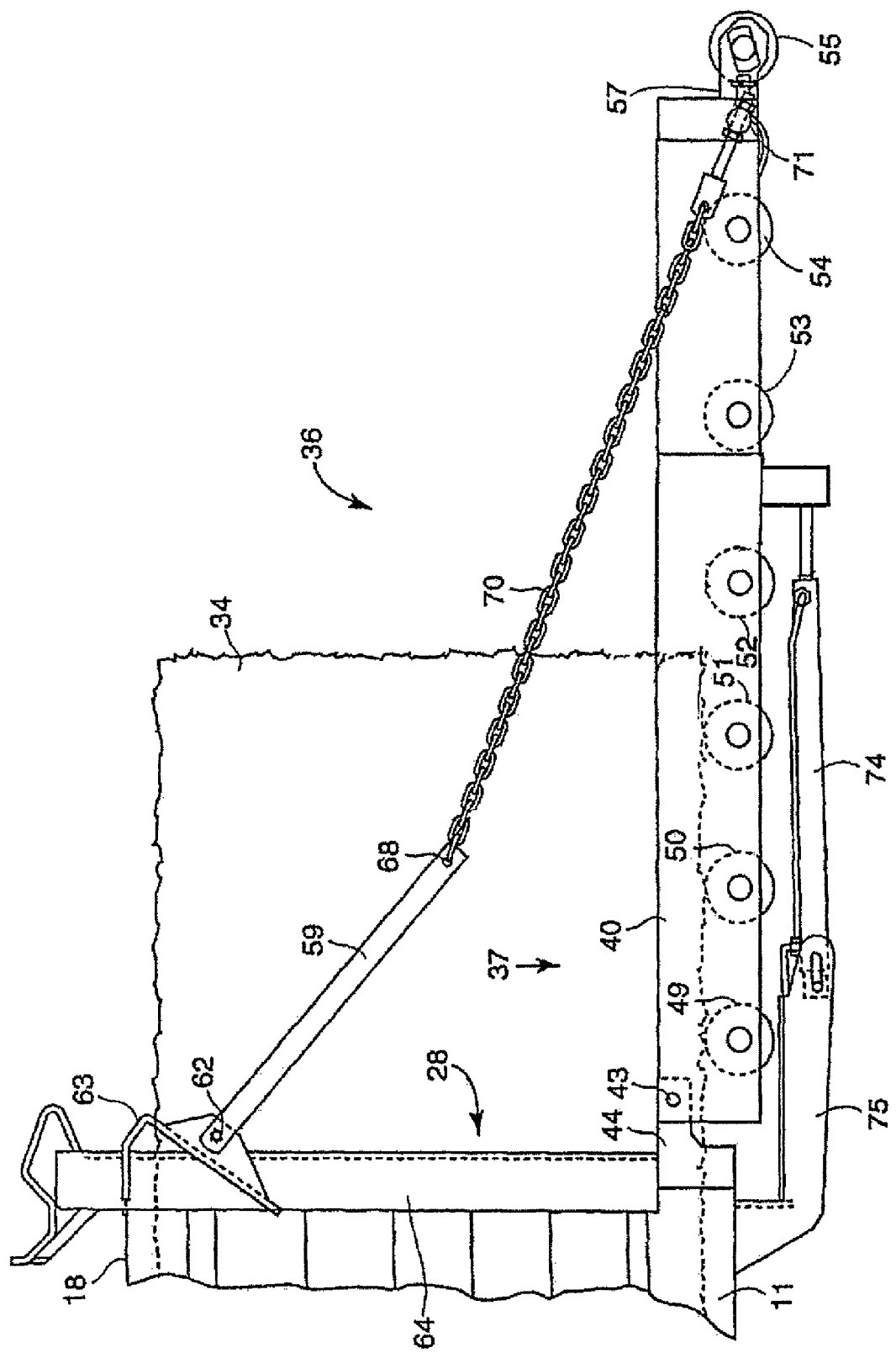
FIG. 3 shows a detail of the bale chute according to FIG. 1 in the first position.

FIG. 3 shows the bale discharge means 36 in the first position when no completed bale is moving thereon.

Possible alternative embodiments of the bale discharge structure involve chains replacing the pull bar 59. It is also conceivable to use an electrical actuator instead of an hydraulic cylinder 74 for moving the discharge means 36 between the first and the second position. It is also conceivable to use a similar structure for a bale chute having less or no rollers 49-54, e.g. wherein the bales are guided along solid plates. However, according to preferred embodiments of the current invention at least at least one roller 55 is positioned such that in the first position of the bale chute 36 upon completion of a completed bale, the completed bale rotates the roller 55 and in that said sensor means 96 is provided to sense the rotation of said roller 55. Although the figures show that the roller 55 is positioned at the end of the bale chute 36, this is not critical for the present invention and the roller 55 can also be positioned in between other rollers or in between solid plates or in a combination, such as for example in between rollers and solid plates.

The movement of the bale on the bale chute 36, preferably the rear chute portion 38, is sensed by the proximity sensor 96. The roller 55 is rotated by the bottom of the bale.

The output of the sensor 96 is fed to a controller, such as for example electronic circuitry including a microprocessor which is programmed to control the actuator when the signal is indicative of a completed bale moving on the bale chute 36. The actuator then subsequently pivots the bale chute 36 from the first into the second operating position sufficiently lowering the trailing end of the bale chute to cause a completed bale to fall onto the field from a trailing end of the bale chute 36 without the risk of being damaged or toppling on its trailing end. Advantageously the controller is incorporated into the microprocessor controlling the other baler functions.

The invention claimed is:

1. An agricultural square baler comprising
a baling chamber configured for compressing crop material forming a bale;
a bale chute disposed at an outlet of said baling chamber for receiving said bale and lowering the completed bale onto the field; and
wherein the bale chute has a leading end connected to the outlet of the baling chamber for pivoting movement about an axis transverse to a direction of travel of the baler between a first position in which bales from the baling chamber are received onto the bale chute and a lowered second position which is inclined to the horizontal such that a trailing end is lowered to prevent a completed bale from toppling or being damaged;
an actuator configured to pivot the bale chute between the first and the second position;
a sensor configured and positioned to sense movement on the bale chute of a completed bale and generating a signal indicative of said movement,
an electric controller configured for controlling the pivoting of the bale chute between the first and the second position by the actuator, wherein the controller, the sensor and the actuator are interconnected,
wherein the controller is configured to control the actuator such that the bale chute is pivoted from the first position to the second position after receiving the signal indicative of movement from the sensor;
wherein the bale chute in the first position slopes with respect to the horizontal such that the leading end is higher than the trailing end.

2. An agricultural square baler according to claim 1, wherein the sloping of the bale chute is such that upon completion of a completed bale, the completed bale moves from the leading end towards the trailing end of the bale chute.

3. An agricultural square baler comprising
a baling chamber configured for compressing crop material forming a bale;
a bale chute disposed at an outlet of said baling chamber for receiving said bale and lowering the completed bale onto the field; and
wherein the bale chute has a leading end connected to the outlet of the baling chamber for pivoting movement about an axis transverse to a direction of travel of the baler between a first position in which bales from the baling chamber are received onto the bale chute and a lowered second position which is inclined to the horizontal such that a trailing end is lowered to prevent a completed bale from toppling or being damaged;
an actuator configured to pivot the bale chute between the first and the second position;
a sensor configured and positioned to sense movement on the bale chute of a completed bale and generating a signal indicative of said movement,
an electric controller configured for controlling the pivoting of the bale chute between the first and the second position by the actuator, wherein the controller, the sensor and the actuator are interconnected,
wherein the controller is configured to control the actuator such that the bale chute is pivoted from the first position to the second position after receiving the signal indicative of movement from the sensor;
wherein the bale chute comprises at least one roller positioned such that when the bale chute is in the first position, the bale moving on the bale chute rotates the roller and said sensor is configured to sense rotation of said roller.

4. An agricultural square baler comprising
a baling chamber configured for compressing crop material forming a bale;
a bale chute disposed at an outlet of said baling chamber for receiving said bale and lowering the completed bale onto the field; and
wherein the bale chute has a leading end connected to the outlet of the baling chamber for pivoting movement about an axis transverse to a direction of travel of the baler between a first position in which bales from the baling chamber are received onto the bale chute and a lowered second position which is inclined to the horizontal such that a trailing end is lowered to prevent a completed bale from to toppling or being damaged;
an actuator configured to pivot the bale chute between the first and the second position,
a sensor configured and positioned to sense movement on the bale chute of a completed bale and generating a signal indicative of said movement,
an electric controller configured for controlling the pivoting of the bale chute between the first and the second position by the actuator, wherein the controller, the sensor and the actuator are interconnected,
wherein the controller is configured to control the actuator such that the bale chute is pivoted from the first position to the second position after receiving the signal indicative of movement from the sensor;
wherein the bale chute comprises at least one roller and said sensor comprises a proximity sensor directed to a member rotated in unison with said roller, the member comprising at least one protrusion changing the distance between the proximity sensor and the surface of the member during revolution of the member in unison with said roller.

5. An agricultural square baler according to claim 1, wherein the actuator is a hydraulic actuator driven by a hydraulic circuit controlled by the controller.

* * * * *